Dec. 4, 1923. 1,476,621
A. E. KINTNER
OPTICAL DEMONSTRATING APPARATUS
Filed June 14, 1922 2 Sheets-Sheet 1

INVENTOR.
Alcuin E. Kintner
BY
Fay, Oberlin & Fay
ATTORNEYS

Dec. 4, 1923.　　　　　　　　　　　　　　　　　　　　1,476,621
A. E. KINTNER
OPTICAL DEMONSTRATING APPARATUS
Filed June 14, 1922　　　　2 Sheets-Sheet 2

INVENTOR.
Alcuin E. Kintner
BY
Day, Oberlin & Day
ATTORNEYS

Patented Dec. 4, 1923.

1,476,621

UNITED STATES PATENT OFFICE.

ALCUIN E. KINTNER, OF PAINESVILLE, OHIO.

OPTICAL DEMONSTRATING APPARATUS.

Application filed June 14, 1922. Serial No. 568,133.

*To all whom it may concern:*

Be it known that I, ALCUIN E. KINTNER, a citizen of the United States, and a resident of Painesville, county of Lake, and State of Ohio, have invented a new and useful Improvement in Optical Demonstrating Apparatus, of which the following is a specification, the principle of the invention being herein explained and the best mode in which I have contemplated applying that principle, so as to distinguish it from other inventions.

The object of the present invention more particularly is to provide a mechanical device or apparatus for demonstrating the movements of the human eye, provision being made for the simulation of the action of the principal cords or muscles whereby the eyeballs are rotated on their optical axes. It is thus rendered possible to ocularly demonstrate muscular imbalances or diplopia and other conditions affecting human vision.

To the accomplishment of the foregoing and related ends, the invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Figure 1:
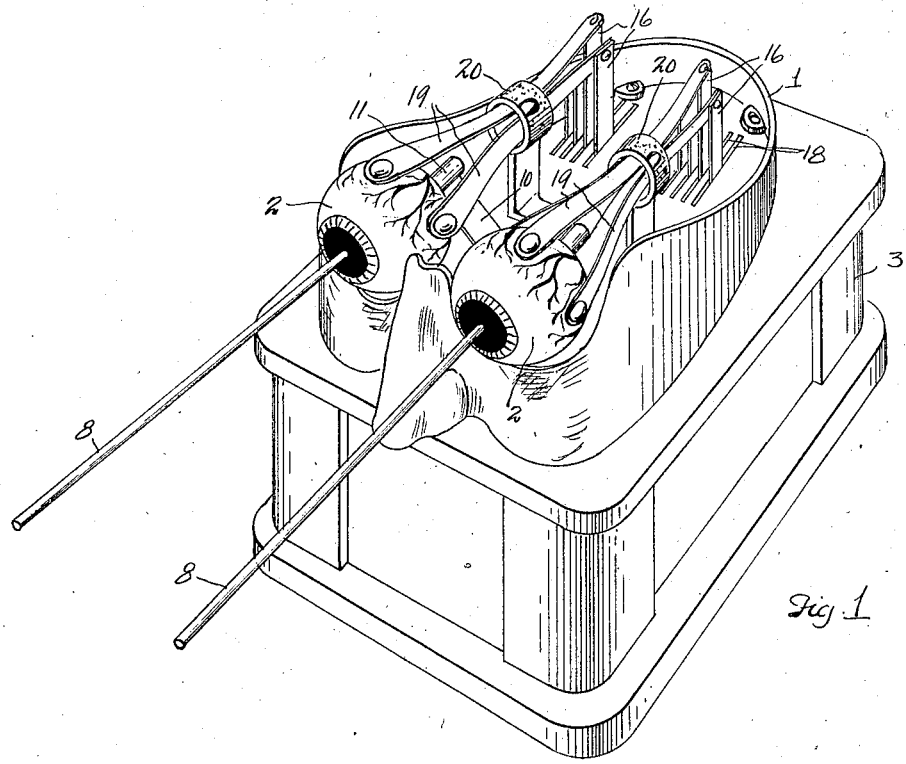
Figure 4:
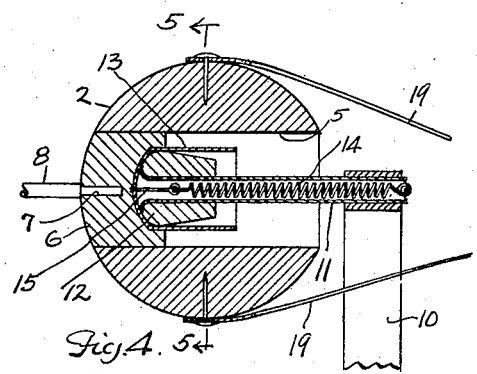
Figure 5:
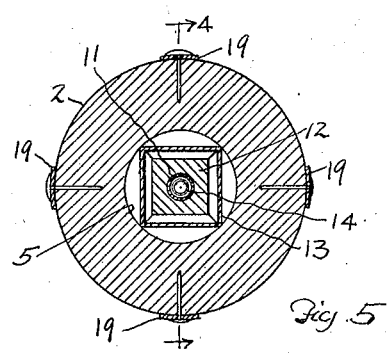
Figure 7:
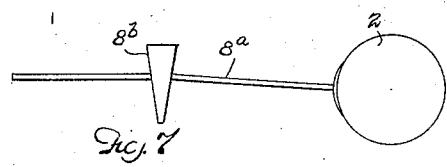
Figure 2:
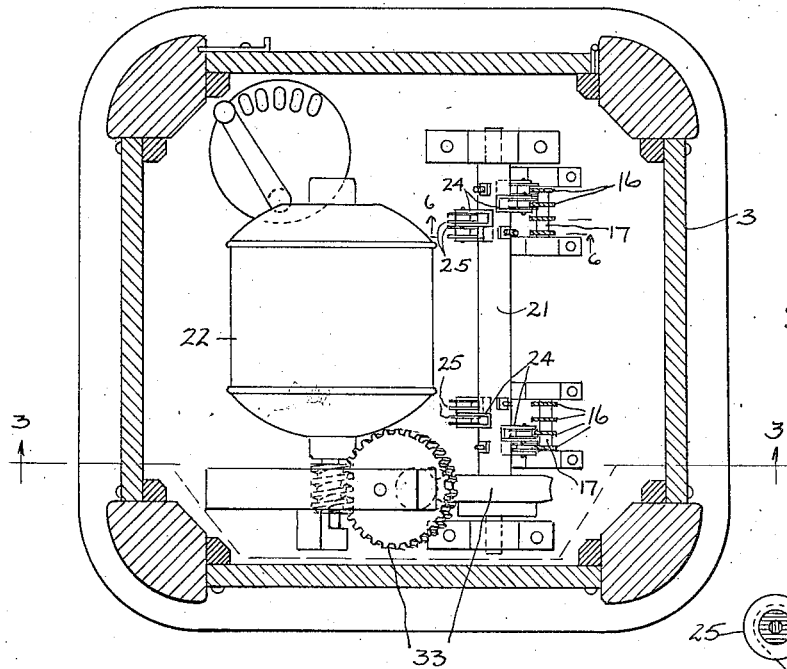
Figure 6:
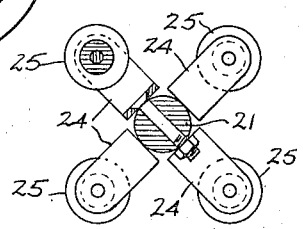
Figure 3:
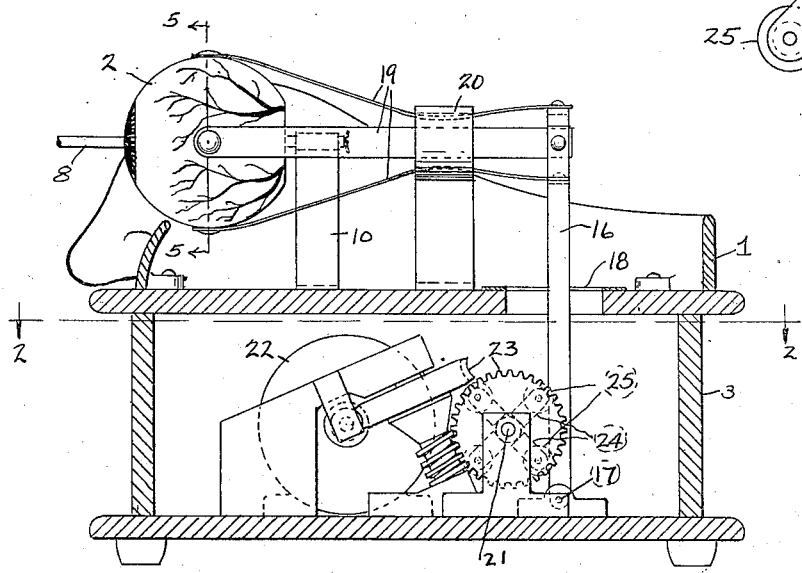

Fig. 1 is a perspective view of my improved demonstrating apparatus; Fig. 2 is a horizontal section through the base of the apparatus showing a portion of the operating mechanism therefor; Fig. 3 is a vertical section of the apparatus taken on the plane indicated by the line 3—3, Fig. 2; Fig. 4 is a vertical axial section through one of the members simulating the eyeballs; Fig. 5 is a transverse vertical section of such eyeball, as indicated by the lines 5—5, Figs. 3 and 4; Fig. 6 is a transverse section of a detail of the operating mechanism, the plane of the section being indicated by the line 6—6, Fig. 2; and Fig. 7 shows a modification in another detail.

Externally, as shown in Fig. 1, my improved apparatus comprises an open shell 1 representing on a suitable, preferably somewhat enlarged, scale a section of the human cranium within which approximately spherical members 2, colored to simulate eyeballs, are suitably mounted, as will be presently described. The foregoing are mounted on top of a cabinet 3 within which the major portion of the operating mechanism for moving the eyeball members 2 is housed (see Figs. 2 and 3).

As shown in Figs. 4 and 5, each of the eyeball members 2 is formed with a longitudinal opening 5 of circular cross-section, the forward end of which is closed by a plug 6 carrying the representation of the diaphragm and iris of the eye and also formed with an axially aligned recess 7 in which may be inserted, if desired, a light rod or wand 8 that will project in an axial direction from the eyeball, thus emphasizing the character and effect of the latter's movement. Each such eyeball is supported from a bracket arm 10 that rises from the top of the cabinet 3 and carries at its upper end a forwardly projecting tubular arm 11, the front end of which is rounded and reinforced by an annular head 12. Such forward end of arm 11 fits inside of a shell 13 that is fixedly secured in plug 6 and forms in effect a concave socket against which such arm end bears. The latter is held in contact with the socket by means of a tension spring 14 that lies in the arm 11 and is attached at its forward end to an eyelet 15 projecting rearwardly within the shell and at its rear end to the rear end of the arm.

As a result of the foregoing construction, the tendency of spring 14 will be to normally maintain the eyeball member 2 with its axis as defined by the rod 8 disposed in a predetermined direction. However, such member may be readily rocked about the ball and socket bearing provided by the forward end of arm 14 and the shell 13, as will be readily understood. For the purpose of effecting such rocking movement, the following means are provided, viz, a plurality of lever arms 16, shown as four in number for each eyeball member, pivotally attached at their lower ends to the floor of the cabinet 3 by means of pins 17, which rise vertically through slots 18 above the top of the cabinet to the rear of the corresponding eyeball member. The respective upper ends of such levers are connected by means of flexible bands 19 with points on the exterior of the eyeball member spaced equidistantly about its periphery, each set of bands passing through an annular guide 20. Disposed parallel with the pins 17 about which the respective sets of levers 16 are thus oscillatory, but at a greater distance above the floor of the cabinet 3, is a shaft 21 that is adapted to be continuously rotated as, for example, by an electric motor 22 through a train of gears 33 which need not be described in detail, it being understood that any other suitable driving means for said shaft, whether hand or power operated, may be substituted. Mounted on shaft 21 adjacent to each set of levers 16 is a corresponding number of radially projecting arms 24 carrying rollers 25 at their outer ends that are adapted, in the course of rotation of the shaft, to successively engage, one with each such lever. The effect of this engagement will be to rock the lever and thereby pull upon the corresponding band 19 that connects the upper end thereof with the eyeball member 2. As a result, the latter will in turn be rocked about its ball and socket mounting so as to turn its axis, as indicated by the rod 8 carried thereby, either to one side or the other or up or down from the normal position of such axis.

As shown in Fig. 6, the arms 24 are disposed ninety degrees apart about the shaft 21 and the movements of the eyeball member controlled through the corresponding set of levers will accordingly occur in sequence during intervals of time approximately equal to one-fourth the period of revolution of the shaft.

Preferably the two sets of arms 24 on shaft 21 will be so arranged as to produce movement of the eyeball members in a horizontal plane simultaneously but in opposite directions so as to show the effect of convergence and divergence of the optical axes of the eyes. Any other desired effect may be automatically secured by proper location of said arms or the operator may manipulate either or both eyeballs directly without rotating the drive shaft 21 by simply pulling on the appropriate lever 16 or the corresponding band 19. Such levers, in other words, are operable independently of the drive shaft and either eyeball member may be accordingly moved from its normal position in any direction desired to show muscular imbalance in all its forms and its effect on binocular vision. The rods or wands 8 may be regarded as beams of light entering the eyes and the effect of proper lenses to correct defect in vision, where muscular imbalances exist, may accordingly be readily demonstrated, as by a bent rod or wand 8$^a$ (see Fig. 7), having a model 8$^b$ of the appropriate lens to produce such bend mounted thereon.

From the foregoing it will be evident that my improved apparatus is equally adaptable for direct demonstration to a student or patient of the action of the various muscles which rotate the eyeballs and for display purposes. It shows perfectly balanced muscles and their action, as well as the various forms of muscular imbalance and the effect thereof on binocular vision. At the same time the action of proper lenses in correcting such imbalance may be readily demonstrated by use of the wands 8 and 8$^a$.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In apparatus of the character described, the combination of an eyeball member supported for oscillation about an interior point, means normally positioning said member about such point, and motor means adapted to oscillate said member in different planes about such point.

2. In apparatus of the character described, the combination of an eyeball member supported for oscillation about an interior point, means normally positioning said member about such point, and motor means adapted to oscillate said member successively in different planes about such point.

3. In apparatus of the character described, the combination of an eyeball member, a support therefor including a horizontal arm having a ball-and-socket connection with the interior of said member, a spring normally positioning said member on said support, and means adapted to oscillate said member in different planes about said support.

4. In apparatus of the character described, the combination of an eyeball member, a support therefor including a horizontal arm having a ball-and-socket connection with the interior of said member, a spring normally positioning said member on said support, and means adapted to oscillate said member in different planes about said support, said means including a plurality of flexible bands attached to said member at spaced points about its periphery.

5. In apparatus of the character described, the combination of an eyeball member, a support therefor including a horizontal arm having a ball-and-socket connection with the interior of said member, a spring normally positioning said member on said support, and means adapted to oscillate said member in different planes about said support, said means including a plurality of flexible bands attached to said member at spaced points about its periphery, corresponding levers attached to said bands, and means adapted to successively oscillate said levers.

6. In apparatus of the character described, the combination of an eyeball member, a support therefor including a hollow, horizontal arm having a ball-and-socket connection with the interior of said member, a tension spring contained within said arm and attached at one end to said member so as to tend to maintain same in normal position on said support, a plurality of flexible bands attached at their forward ends to said member at spaced points about its periphery, a guide for said bands, corresponding levers attached at their upper ends to the rear ends of said bands, respectively, a rotatable shaft disposed transversely of said levers, and a plurality of radial arms carried by said shaft and adapted to successively engage and oscillate said levers.

7. In apparatus of the character described, the combination of a pair of oscillatorily supported eyeball members, and means enabling said members to be oscillated independently of each other to simulate the action of various muscles in demonstrating muscular imbalance, substantially as described.

8. In apparatus of the character described, the combination of a pair of oscillatorily supported eyeball members, motor means adapted to oscillate said members conjointly to simulate the action of various muscles, and rods axially projecting from said members, respectively, and representing beams of light entering the same.

Signed by me this 15th day of November, 1921.

ALCUIN E. KINTNER.